(12) United States Patent
Ji et al.

(10) Patent No.: US 10,978,882 B2
(45) Date of Patent: Apr. 13, 2021

(54) CONSTANT-CURRENT CHARGING CIRCUIT, ENERGY STORAGE POWER SOURCE AND CONSTANT-CURRENT CHARGING METHOD

(71) Applicant: Dong Guan Juxing Power Co., Ltd., Dongguan (CN)

(72) Inventors: Yexin Ji, Dongguan (CN); Yuefei Liao, Dongguan (CN)

(73) Assignee: Dong Guan Juxing Power Co., Ltd., Dongguan (CN)

( * ) Notice: Subject to any disclaimer, the term of this patent is extended or adjusted under 35 U.S.C. 154(b) by 739 days.

(21) Appl. No.: 15/880,468

(22) Filed: Jan. 25, 2018

(65) Prior Publication Data

US 2018/0337543 A1    Nov. 22, 2018

(30) Foreign Application Priority Data

May 16, 2017  (CN) .......................... 201710345961.X
May 16, 2017  (CN) .......................... 201720544010.0

(51) Int. Cl.
*H02M 3/06*  (2006.01)
*H02J 7/00*  (2006.01)
*H02M 3/08*  (2006.01)

(52) U.S. Cl.
CPC .............. *H02J 7/00* (2013.01); *H02J 7/0072* (2013.01); *H02M 3/06* (2013.01); *H02M 3/08* (2013.01); *H02J 2207/20* (2020.01)

(58) Field of Classification Search
CPC ...... H02J 7/00; H02J 7/007; H02J 7/04; H02J 7/045; H02J 7/0072; H02J 7/00714; H02J 2207/20; H02J 1/04; H02M 3/06; H02M 3/08; H05B 45/345
See application file for complete search history.

(56) References Cited

U.S. PATENT DOCUMENTS

| 2007/0108943 | A1* | 5/2007 | Kobayashi | H02J 7/342 320/128 |
| 2011/0080103 | A1* | 4/2011 | Reed | H02M 3/33507 315/219 |
| 2017/0271987 | A1* | 9/2017 | Yu | H02M 3/1582 |
| 2018/0262042 | A1* | 9/2018 | Tian | H02J 7/00714 |

* cited by examiner

*Primary Examiner* — Richard Isla
*Assistant Examiner* — Johali A Torres Ruiz

(57) ABSTRACT

The present invention discloses a constant-current charging circuit, energy storage power source and constant-current charging method. The constant-current charging circuit includes a DC-DC converting circuit and a current-feedback circuit. A voltage output of the DC-DC converting circuit is a positive output of the constant-current charging circuit. A negative output of the DC-DC converting circuit is connected to a ground. The DC-DC converting circuit is connected to positive and negative terminals for a direct current voltage power supply. The current-feedback circuit includes first to third resistors and a reference voltage terminal. The reference voltage terminal is connected to the ground via the first to third resistors being connected in series. A connection point between the third resistor and the second resistor is a negative output of the constant-current charging circuit. A connection point between the first and second resistors is connected with a feedback terminal of the DC-DC converting circuit.

10 Claims, 2 Drawing Sheets

CONSTANT-CURRENT CHARGING CIRCUIT, ENERGY STORAGE POWER SOURCE AND CONSTANT-CURRENT CHARGING METHOD

TECHNICAL FIELD

The invention relates to a constant-current charging circuit, an energy storage power source and a constant-current charging method.

TECHNICAL BACKGROUND

Constant-current charging, especially constant-current charging with high current, is used for charging known lithium batteries. However there are no ASICs (application specific integrated circuits) for this kind of charging circuit. For charging lithium batteries, currently there are three methods which include using specific constant-current ICs, using constant-voltage ICs having operational amplifiers and using in series connected sampling resistors of voltage feedback and sampling resistors of current. The three methods have the following defects respectively.

For the solution of using specific constant-current ICs, the circuit cost is high. Generally a price of an IC allowing outputting 2A current is above 3 yuan. And since voltage and current parameters are restricted very few ICs can be used and there is nearly no replacements.

For the solution of using constant-voltage ICs having operational amplifiers, the circuit cost is also high. Generally, an ordinary IC with operation amplifiers needs 0.6 yuan and the cost will be increased to 1 yuan if other peripheral components are considered. Secondly the circuit is complex and the stability of a control loop of the circuit is poor.

For the method of using in series connected sampling resistors of voltage feedback and sampling resistors of current, controllability of the method is poor and output current may not be constant when a load changes in a large range. Secondly the stability is poor and an output current will be changed with changes of an output voltage.

Therefore, it is necessary to design a new constant-current charging circuit and a constant-current charging method.

SUMMARY

The technical problem solved by the present invention is to provide a constant-current charging circuit, an energy storage power source and a constant-current charging method, and the constant-current charging circuit is easy to be implemented, and has good flexibility, stability and low cost.

According to one aspect of the present invention, a constant-current charging circuit comprises a DC-DC converting circuit and a current-feedback circuit. A voltage output of said DC-DC converting circuit is a positive output of said constant-current charging circuit. A negative output of said DC-DC converting circuit is connected to a ground. Said DC-DC converting circuit is connected to positive and negative terminals for a direct current voltage power supply. A current-feedback circuit includes first to third resistors and a reference voltage terminal. Said reference voltage terminal is connected to said ground via said first to third resistors being connected in series. A connection point between said third resistor and said second resistor is a negative output of said constant-current charging circuit. A connection point between said first resistor and said second resistor is connected with a feedback terminal of said DC-DC converting circuit.

Preferably, said constant-current charging circuit further comprises a voltage-feedback circuit which comprises a fourth resistor, a fifth resistor and a diode, said fourth resistor and said fifth resistor being connected in series between said positive output of said constant-current charging circuit and said ground, a connection point between said fourth resistor and said fifth resistor being connected with an anode of said diode, and a cathode of said diode being connected with said feedback terminal of said DC-DC converting circuit.

Preferably, a first capacitor is connected between said positive output terminal and said negative terminal of said constant-current charging circuit.

Preferably, a second capacitor is connected between said positive terminal and said negative terminal.

Preferably, said DC-DC converting circuit adopts a ZTP7192 device. Alternatively, MP1495, MP1593, RT8296, MC34063, FP5138, etc., which can be bought in market, may adopted.

Another aspect of the present invention provides an energy storage power source which includes an energy storage module and the above-described constant-current charging circuit for charging said energy storage module.

Preferably, said energy module is a lithium battery or a super capacitor.

Another aspect of the present invention provides a constant-current charging method achieved by a DC-DC converting circuit and a current-feedback circuit, wherein said current-feedback circuit comprises a first resistor, a second resistor, a third resistor and a reference voltage terminal, wherein said method comprises:

connecting a voltage output of said DC-DC converting circuit to a positive output of said constant-current charging circuit and connecting a negative output of said DC-DC converting circuit to a ground;

powering said DC-DC converting circuit by a direct current voltage power supply via a positive terminal and a negative terminal;

connecting said reference voltage terminal to said ground via said first resistor, said second resistor and said third resistor being connected in series;

connecting a connection point between said third resistor and said second resistor to a negative output of said constant-current charging circuit; and connecting a connection point between said first resistor and said second resistor to a feedback terminal of said DC-DC converting circuit.

Preferably, said method further comprises a step of overvoltage protecting which is achieved by a voltage-feedback circuit and said DC-DC converting circuit. Said voltage-feedback circuit includes a fourth resistor, a fifth resistor and a diode, said fourth resistor and said fifth resistor connected in series are connected between said positive output of said constant-current charging circuit and said ground, a connection point between said fourth resistor and said fifth resistor is connected with an anode of said diode, and a cathode of said diode is connected with said feedback terminal of said DC-DC converting circuit.

Preferably, a first capacitor is connected between said positive output and said negative output of said constant-current charging circuit.

Preferably, a second capacitor C1 is connected between said positive terminal and said negative terminal.

Preferably, a third capacitor is connected between said feedback terminal and said ground.

A reference-voltage constant-current method is used in the present invention, in which constant current is achieved by controlling a voltage feedback with a current-feedback loop which is formed by a dividing voltage of a reference power and a sampling resistor.

The present invention provides a constant-current charging circuit, an energy storage power source and a constant-current charging method, which are a new solution for achieving constant-current charging. In the present invention constant-current is achieved by using a constant-voltage chip. Moreover, the value of the output current can be flexibly set and the solution has good flexibility. And application effects of the present invention are better than traditional solutions using constant-current chips. Practice shows that the charging circuit of the present invention has outstanding control effect and reduces the cost significantly.

DESCRIPTION OF THE EMBODIMENTS

The present invention will be further described in detail with reference to the drawings and embodiments.

Figure 1:
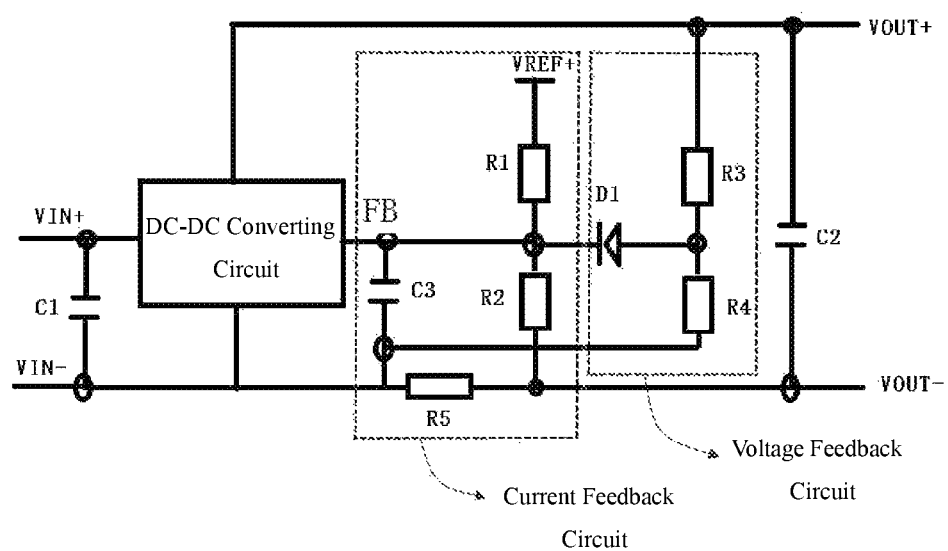
FIG. 1 is a principle diagram of a constant-current charging circuit according to an embodiment of the present invention.
Figure 2:
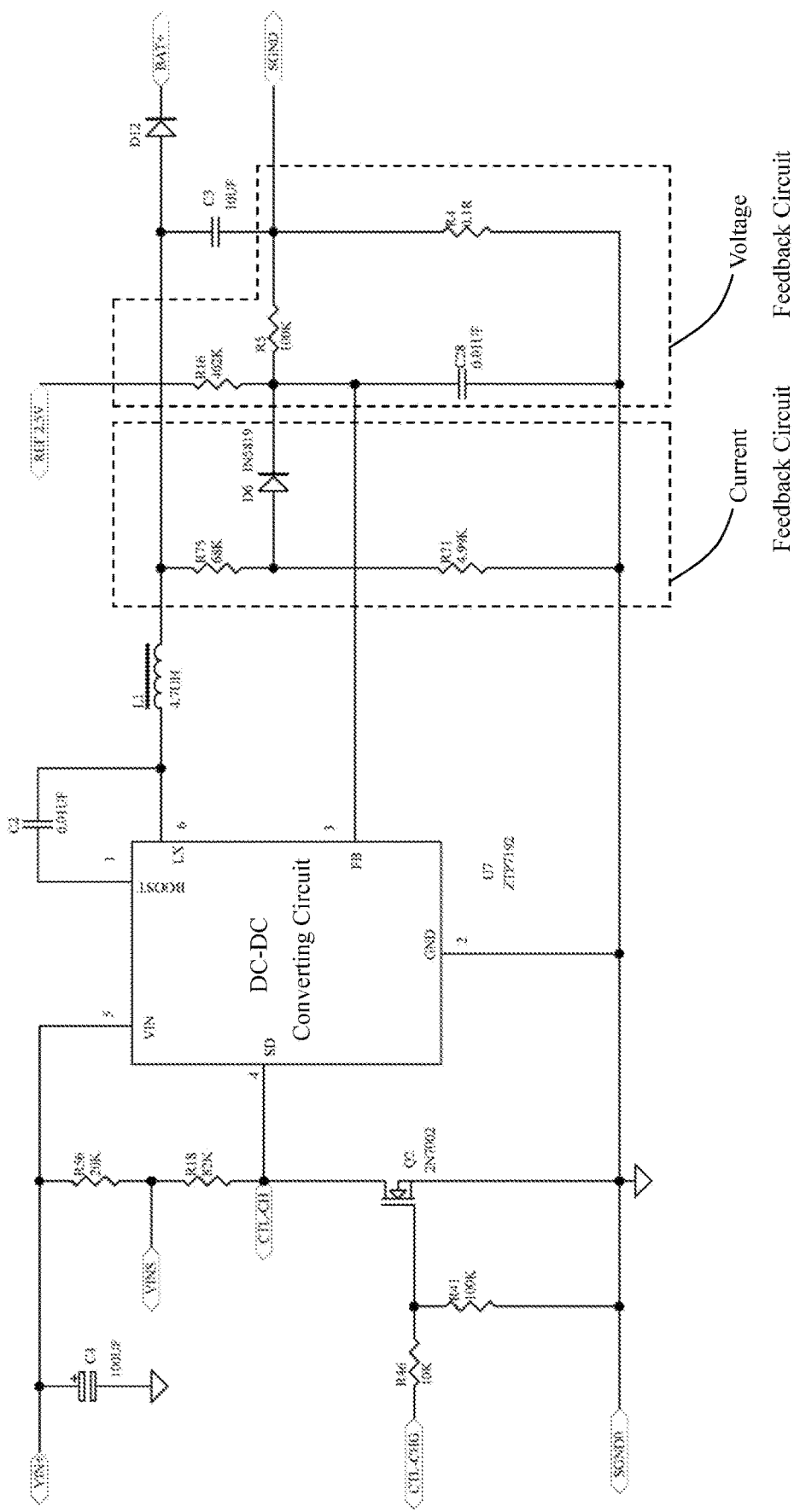
FIG. 2 is a circuit of a specific application of the constant-current charging circuit in FIG. 1.

FIG. 1 is a principle diagram is of a constant-current charging circuit according to an embodiment of the present invention, of elements and labels shown in FIG. 1 are referred to as follows:

VIN+ is a positive terminal of an input power source,
VIN− is a negative terminal of the input power source,
VOUT+ is a positive output of an output power source,
VOUT− is a negative output of the output power source,
VREF+ is a positive terminal of a reference power source,
C1 is an input filter capacitor,
C2 is an output filter capacitor,
C3 is a current sampling feedback filter capacitor,
R1, R2, R5 and R3 form a current sampling feedback circuit,
R3 and R4 form a voltage sampling feedback circuit, and
D1 is an isolating diode.

A working principle of the present invention is described as follows.

A stable reference power source is used as a reference voltage and a divided voltage equal to a feedback terminal FB is obtained via resistors R1, R2 and R5, thereby controlling a value of an output current by adjusting an inner PWM signal of a DC-DC converting circuit via the feedback terminal FB. For example, a voltage across the sampling resistor R5 will rise when the output current increases. Since the voltage at the reference voltage terminal VRFE+ is a fixed value, the voltage at the feedback terminal FB also rises. Duty cycle of the PWM signal will decrease due to the rise of the voltage at the feedback terminal FB, therefore the output current will decrease. In such way, a complete feedback can be accomplished so as to achieve the purpose of stabilizing the output current.

Principle of the constant current charging is described as follows:

Assuming that a voltage across the resistor R5 is Vlo, the output current is Io, the reference voltage at reference voltage terminal VRFE+ is 2.5V, the voltage at the feedback terminal FB VFB is 0.6V, R5=0.1Ω, R1=40KΩ, R2=10KΩ.

$$Vlo=Io*R5$$

$$VFB=Vlo+((VREF+-Vlo)*R2/(R1+R2))$$

From above equations, the output current Io can be obtained by following formula.

$$Io=(VFB*(R1+R2)-R2*VREF+)/R1*R5$$

if $K=(VFB*(R1+R2)-R2*VREF+)/R1$, then $$Io=K/R5.$$

It can be seen from the calculation formulas that the output current Io is independent from the output voltage and input voltage. The output current Io is only in relation to VFB, R1, R2, and VREF which all have fixed values in a specific design (the voltage VFB is fixed in a steady state, and its steady-state value is 0.6 v for a constant-voltage chip fp7192), so K is certainly a fixed value. Therefore, the output current has excellent linearity and good controllability.

The value of the output current can be calculated as follow if above parameters are assigned with the specific values set previously.

$$Io = (VFB*(R1+R2) - R2*VREF+)/R1*R5$$
$$= (0.6*(40+10) - 10*2.5)/40*0.1$$
$$= 1.25A$$

Preferably, the DC-DC converting circuit is a constant voltage driving IC, such as FP7192.

It can be seen from the above equations that a fixed reference voltage is introduced so that the output current Io becomes linearly in relation with the sampling resistor R5. As a result, the output current Io is constant and the purpose of constant current charging can be achieved.

The reference voltage constant-current method in this solution has the following characteristics: 1. It is convenient to control accuracy and stability by using a stable and fixed reference voltage; 2. It is simpler and more reliable by using a resistor divider feedback to replace current sampling; 3. It has wide application and can be used in any circuit which requires constant current; and 4. The cost reduces significantly, for example, the cost for the solution using a constant current IC and having an output of 12V/1 A is about 3 yuan while the cost for the solution provided by the present invention is within 1 yuan.

The invention claimed is:

1. A constant-current charging circuit, comprising:
a DC-DC converting circuit, a voltage output of said DC-DC converting circuit being a positive output (VOUT+) of said constant-current charging circuit, a negative output of said DC-DC converting circuit being connected to a ground, said DC-DC converting circuit being connected to a positive terminal (VIN+) and a negative terminal (VIN−) for a direct current voltage power supply; and
a current-feedback circuit comprising a first resistor (R1), a second resistor (R2), a third resistor (R5) and a reference voltage terminal (VREF+), said reference voltage terminal (VREF+) being connected to said ground via said first resistor (R1), said second resistor (R2) and said third resistor (R5) being connected in series, a connection point between said third resistor (R5) and said second resistor (R2) being a negative output (VOUT−) of said constant-current charging circuit, and a connection point between said first resistor (R1) and said second resistor (R2) being connected with a feedback terminal (FB) of said DC-DC converting circuit.

2. Said constant-current charging circuit according to claim 1, further comprising a voltage-feedback circuit which comprises a fourth resistor (R3), a fifth resistor (R4) and a diode (D1), said fourth resistor (R3) and said fifth resistor (R4) being connected in series between said positive output (VOUT+) of said constant-current charging circuit and said ground, a connection point between said fourth resistor (R3) and said fifth resistor (R4) being connected with an anode of said diode (D1), and a cathode of said diode (D1) being connected with said feedback terminal (FB) of said DC-DC converting circuit.

3. Said constant-current charging circuit according to claim 1, wherein a first capacitor (C2) is connected between said positive output (VOUT+) and said negative output (VOUT−) of said constant-current charging circuit.

4. Said constant-current charging circuit according to claim 1, wherein a second capacitor (C1) is connected between said positive terminal (VIN+) and said negative terminal (VIN−).

5. Said constant-current charging circuit according to claim 1, wherein said DC-DC converting circuit adopts a ZTP7129 device.

6. An energy storage power source, comprising an energy storage module and a constant-current charging circuit according to claim 1 for charging said energy storage module.

7. Said energy storage power source according to claim 6, wherein said energy storage module is a lithium battery or a super capacitor.

8. A constant-current charging method achieved by a DC-DC converting circuit and a current-feedback circuit, wherein said current-feedback circuit comprises a first resistor (R1), a second resistor (R2), a third resistor (R5) and a reference voltage terminal (VREF+), wherein said method comprises:

connecting a voltage output of said DC-DC converting circuit to a positive output (VOUT+) of said constant-current charging circuit and connecting a negative output of said DC-DC converting circuit to a ground;

powering said DC-DC converting circuit by a direct current voltage power supply via a positive terminal (VIN+) and a negative terminal (VIN−);

connecting said reference voltage terminal (VREF+) to said ground via said first resistor (R1), said second resistor (R2) and said third resistor (R5) being connected in series;

connecting a connection point between said third resistor (R5) and said second resistor (R2) to a negative output (VOUT−) of said constant-current charging circuit; and connecting a connection point between said first resistor (R1) and said second resistor (R2) to a feedback terminal (FB) of said DC-DC converting circuit.

9. Said constant-current charging method according to claim 8, further comprising a step of overvoltage protection which is achieved by a voltage-feedback circuit and said DC-DC converting circuit;

wherein said voltage-feedback circuit comprises a fourth resistor (R3), a fifth resistor (R4) and a diode (D1); and wherein said fourth resistor (R3) and said fifth resistor (R4) connected in series are connected between said positive output (VOUT+) of said constant-current charging circuit and said ground, a connection point between said fourth resistor (R3) and said fifth resistor (R4) is connected with an anode of said diode (D1), and a cathode of said diode (D1) is connected with said feedback terminal (FB) of said DC-DC converting circuit.

10. Said constant-current charging method according to claim 9, wherein a first capacitor (C2) is connected between said positive output (VOUT+) and said negative output (VOUT−) of said constant-current charging circuit, and a second capacitor (C1) is connected between said positive terminal (VIN+) and said negative terminal (VIN−).

* * * * *